United States Patent
Gollan et al.

(10) Patent No.: US 9,406,299 B2
(45) Date of Patent: Aug. 2, 2016

(54) DIFFERENTIAL ACOUSTIC MODEL REPRESENTATION AND LINEAR TRANSFORM-BASED ADAPTATION FOR EFFICIENT USER PROFILE UPDATE TECHNIQUES IN AUTOMATIC SPEECH RECOGNITION

(75) Inventors: Christian Gollan, Aachen (DE); Daniel Willett, Walluf (DE)

(73) Assignee: Nuance Communications, Inc., Burlington, MA (US)

( * ) Notice: Subject to any disclaimer, the term of this patent is extended or adjusted under 35 U.S.C. 154(b) by 46 days.

(21) Appl. No.: 14/399,867

(22) PCT Filed: Mar. 8, 2012

(86) PCT No.: PCT/US2012/036903
§ 371 (c)(1),
(2), (4) Date: Nov. 7, 2014

(87) PCT Pub. No.: WO2013/169232
PCT Pub. Date: Nov. 14, 2013

(65) Prior Publication Data
US 2015/0149174 A1    May 28, 2015

(51) Int. Cl.
| | | |
|---|---|---|
| *G10L 15/00* | (2013.01) | |
| *G10L 17/06* | (2013.01) | |
| *G10L 15/28* | (2013.01) | |
| *G10L 15/07* | (2013.01) | |
| G10L 15/22 | (2006.01) | |
| G10L 15/30 | (2013.01) | |

(52) U.S. Cl.
CPC ............... *G10L 17/06* (2013.01); *G10L 15/07* (2013.01); *G10L 15/285* (2013.01); *G10L 15/30* (2013.01); *G10L 2015/227* (2013.01)

(58) Field of Classification Search
CPC ...... G10L 15/065; G10L 15/07; G10L 15/144; G10L 17/04
USPC .......................................................... 704/246
See application file for complete search history.

(56) References Cited

U.S. PATENT DOCUMENTS 5,027,406 A * 6/1991 Roberts .................. G10L 15/22
                                                              704/244
5,864,810 A * 1/1999 Digalakis ................ G10L 17/00
                                                              704/254

(Continued)

FOREIGN PATENT DOCUMENTS

| EP | 1400952 A1 | 3/2004 |
| EP | 1732063 A1 | 12/2006 |
| GB | 2480085 A | 11/2011 |

OTHER PUBLICATIONS

International Search Report and Written Opinion for PCT/US2012/036903, mailed Apr. 29, 2013.

*Primary Examiner* — Daniel Abebe
(74) *Attorney, Agent, or Firm* — Banner & Witcoff, Ltd.

(57) ABSTRACT

A computer-implemented method is described for speaker adaptation in automatic speech recognition. Speech recognition data from a particular speaker is used for adaptation of an initial speech recognition acoustic model to produce a speaker adapted acoustic model. A speaker dependent differential acoustic model is determined that represents differences between the initial speech recognition acoustic model and the speaker adapted acoustic model. In addition, an approach is also disclosed to estimate speaker-specific feature or model transforms over multiple sessions. This is achieved by updating the previously estimated transform using only adaptation statistics of the current session.

20 Claims, 3 Drawing Sheets

(56) References Cited

U.S. PATENT DOCUMENTS

| | | | |
|---|---|---|---|
| 6,151,575 A * | 11/2000 | Newman | G10L 15/07 704/231 |
| 6,343,267 B1 * | 1/2002 | Kuhn | G10L 15/07 704/222 |
| 7,379,868 B2 | 5/2008 | Reynolds | |
| 2005/0182626 A1 * | 8/2005 | Kim | G10L 15/07 704/245 |
| 2008/0004876 A1 | 1/2008 | He et al. | |
| 2009/0024390 A1 | 1/2009 | Deshmukh et al. | |

* cited by examiner

DIFFERENTIAL ACOUSTIC MODEL REPRESENTATION AND LINEAR TRANSFORM-BASED ADAPTATION FOR EFFICIENT USER PROFILE UPDATE TECHNIQUES IN AUTOMATIC SPEECH RECOGNITION

CROSS-REFERENCE TO RELATED APPLICATION

This application is the National Stage of International Application No. PCT/US2012/036903, filed May 8, 2012, which is incorporated herein by reference.

FIELD OF THE INVENTION

The invention generally relates to automatic speech recognition (ASR), and more specifically to efficient adaptation techniques to update acoustic domain or user profiles, as e.g. used in server-based ASR.

BACKGROUND ART

An automatic speech recognition (ASR) system determines a semantic meaning of input speech. Typically, the input speech is processed into a sequence of digital speech feature frames. Each speech feature frame can be thought of as a multi-dimensional vector that represents various characteristics of the speech signal present during a short time window of the speech. In a continuous recognition system, variable numbers of speech frames are organized as "utterances" representing a period of speech followed by a pause, which in real life loosely corresponds to a spoken sentence or phrase.

The ASR system compares the input speech frames to a database of statistical models to find the models that best match the speech feature characteristics and determine a corresponding representative text or semantic meaning associated with the models. Modern statistical models are state sequence models such as hidden Markov models (HMMs) that model speech sounds (usually phonemes) using mixtures of Gaussian distributions. Often these statistical models represent phonemes in specific contexts, referred to as PELs (Phonetic Elements), e.g. triphones or phonemes with known left and/or right contexts. State sequence models can be scaled up to represent words as connected sequences of acoustically modeled phonemes, and phrases or sentences as connected sequences of words. When the statistical models are organized together as words, phrases, and sentences, additional language-related information is also typically incorporated into the models in the form of language modeling.

The words or phrases associated with the best matching model structures are referred to as recognition candidates or hypotheses. A system may produce a single best recognition candidate—the recognition result—or a list of several hypotheses, referred to as an N-best list. Further details regarding continuous speech recognition are provided in U.S. Pat. No. 5,794,189, entitled "Continuous Speech Recognition," and U.S. Pat. No. 6,167,377, entitled "Speech Recognition Language Models," the contents of which are incorporated herein by reference.

There are various established techniques for specializing the acoustic models of a speaker-independent speech recognizer to the speech characteristics of a single speaker or certain group of speakers or a specific acoustic channel. Well known and popular acoustic model parameter adaptation methods include linear transform based approaches such as maximum likelihood linear regression (MLLR) and maximum a posteriori (MAP), and model-space approaches such as discriminative acoustic model parameter refinement methods. See M. J. F. Gales, *Maximum Likelihood Linear Transformations For HMM-Based Speech Recognition*, Technical Report TR. 291, Cambridge University, 1997; J.-L. Gauvain, and C.-H. Lee, *Maximum A Posteriori Estimation for Multivariate Gaussian Mixture Observations of Markov Chains*, IEEE Transactions on Speech and Audio Processing, 1994; D. Povey, P. C. Woodland, and M. J. F. Gales, *Discriminative MAP for Acoustic Model Adaptation*, ICASSP, 2003; all of which are incorporated herein by reference. These are used in many speech recognition applications as tools for speaker-specific performance improvements.

In online speech recognition applications such as command & control, dictation, and voice search, an acoustic model can be cumulatively adapted for a particular speaker based on speech samples obtained during multiple sessions with the speaker. The adaptation may include accumulating adaptation statistics after each utterance recognition based on the speech input of the utterance and the corresponding recognition result. An adaptation transform may be updated after every number M utterance recognitions using some number T seconds worth of recognition statistics. (See, e.g., U.S. Patent Publication 2008/0004876, which is incorporated herein by reference). The model can be modified during the session or after the session is terminated. Upon termination of the session, the modified model is then stored in association with an identification of the speaker. During subsequent remote sessions, the speaker is identified and, then, the modified acoustic model is utilized to recognize the speaker's speech. (See e.g., U.S. Pat. No. 6,766,295, which is incorporated herein by reference).

In state-of-the-art speech transcription systems that perform offline (batch mode) speech recognition it is common practice to apply acoustic model adaptation techniques to improve recognition accuracy, but there problems in implementing such adaptation techniques in large-scale real-time server-based speech recognition. For example, acoustic model adaptation cannot be applied in a fully unconstrained manner because keeping available millions of acoustic models at low switching time is infeasible. In addition, it is not feasible to in large scale real-time server-based speech recognition to keep available millions of user-dependent acoustic model adaptation statistics or to re-estimate the user-dependent statistics after each application usage.

SUMMARY OF THE INVENTION

Embodiments of the present invention include a computer-implemented method for speaker adaptation in automatic speech recognition. Speech recognition data from a particular speaker is used for adaptation of an initial speech recognition acoustic model to produce a speaker adapted acoustic model. A speaker dependent differential acoustic model is determined that represents differences between the initial speech recognition acoustic model and the speaker adapted acoustic model.

The stored speaker differential acoustic model may be retrieved from memory and processed with the initial speech recognition acoustic model to derive the speaker adapted acoustic model for speech recognition for the particular speaker. Storing the speaker differential acoustic model may include selecting a limited subset of parameter differences for storage in order to control the memory size of the speaker differential acoustic model.

Embodiments of the present invention also include another computer implemented method for speaker adaptation in automatic speech recognition. The system loads a user profile for a particular speaker that includes an initial user feature transform for speaker adapted speech recognition acoustic models. The initial user feature transform is used with speaker independent speech recognition acoustic models to perform speech recognition for a session of speech utterances from the particular speaker. The system then determines a session update transform in a computer process for a linear transform-based speaker adaptation of the initial user feature transform based on speech recognition data from the session. The initial user feature transform and the session update transform are combined together to produce an updated user feature transform. An updated user profile which includes the updated user feature transform is then stored for subsequent speech recognition with the particular speaker.

The transformation may be expressed as transformation matrices with or without bias vectors, or by only bias vectors. For CMLLR adaptation the transformation is applied to the acoustic observation vectors, or for MLLR adaptation the transformation is applied to the component mean vectors. And the speaker adaptation, with speech recognition data from the session, may include using relevance smoothing (e.g. with statistics from the original model).

DETAILED DESCRIPTION OF SPECIFIC EMBODIMENTS

Various embodiments of the present invention are directed to large scale real-time server-based speech recognition and the use of a storage efficient representation of an adapted acoustic model in the form of a differential acoustic model representation. This includes deriving the adapted acoustic model based on the original acoustic model and the differential acoustic model representation and being able to adjust the data size of the differential acoustic model representation by storing only the most important parameter differences as an approximation of the adapted model. Such arrangements can provide for efficient storage and switching costs (load latency) of user profiles in adaptation of a speech recognition system across multiple remote sessions with a particular speaker (See e.g. U.S. Pat. No. 6,766,295, which is incorporated herein by reference). Embodiments also can approximate the change performed on the acoustic model by adaptation with a compact profile of parameter differences such as clusters of Gaussian mean shifts (also known as shift-MLLR or shift-CMLLR, when shifts are applied to the acoustic observation vectors).

Figure 1:
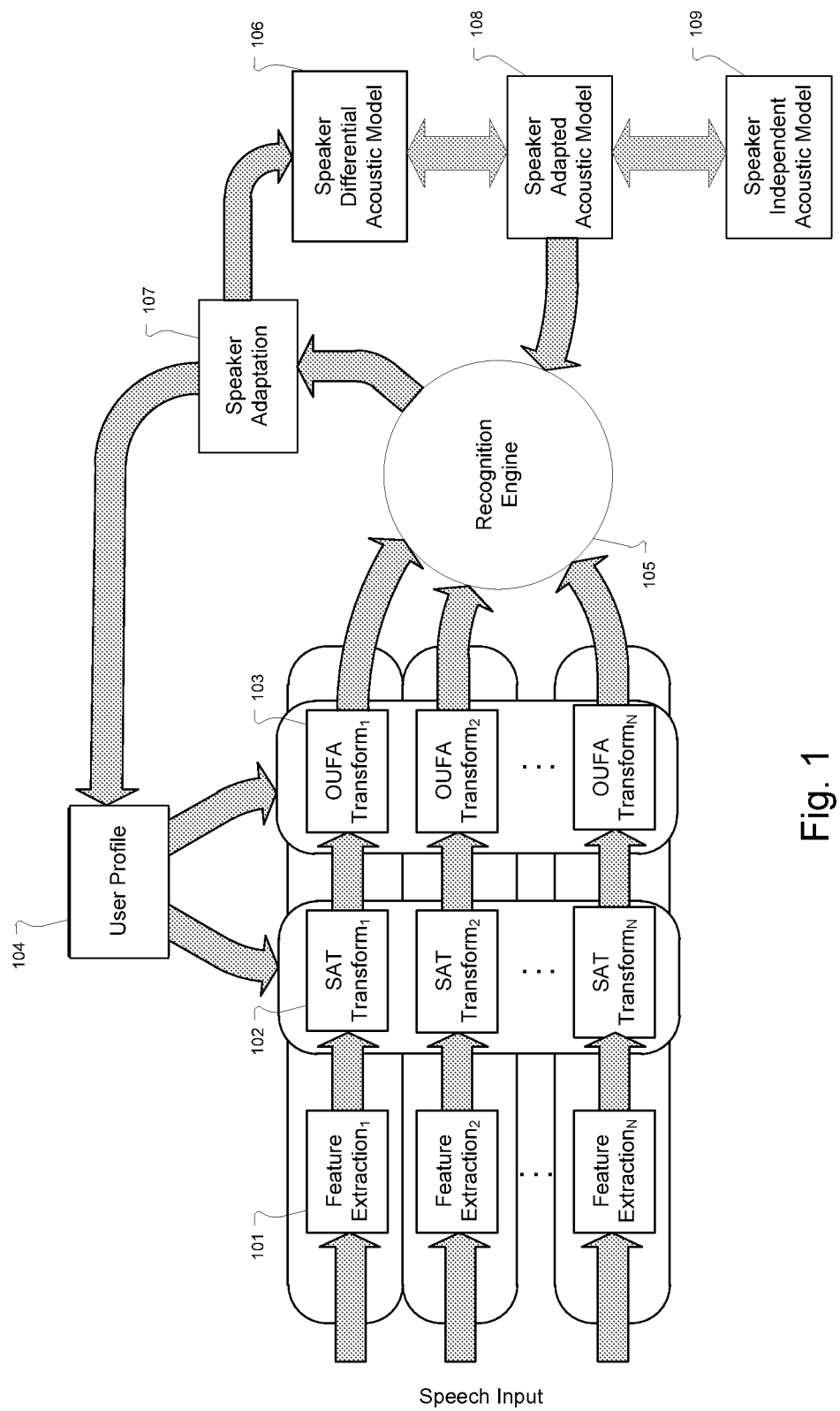
FIG. 1 shows an example of ASR system according to one embodiment of the present invention.

FIG. 1 shows an example of a server-based speech recognition system for handling multiple speakers on N-multiple parallel inputs. Speech inputs are initially front-end processed by a feature extraction module 101 to produce a sequence of representative feature vectors ("speech frames"). For the speech of a given particular speaker, the system loads a user profile 104 which includes one or more user feature transforms that represent speaker adapted speech recognition data from previous sessions. The user feature transform provides the basis for defining one or more speaker transforms that are applied to the speech feature input. In this case, FIG. 1 shows a system that loads speaker dependent adaptation transforms from a user profile 104 for a Speaker Adaptive Training (SAT) Transform Module 102 and an Online Unsupervised Feature Space Adaptation (OUFA) Transform Module 103 (See e.g., U.S. Patent Publication 2008/0004876, which is incorporated herein by reference) to apply speaker dependent feature space transforms to the incoming feature stream. When the speaker is new to the system (no prior user profile) the initial user feature transform may be an identity transform.

The recognition engine 105 then performs speech recognition of the user transformed speech features as constrained by a recognition language model and search algorithm to produce a representative recognition output. The recognition engine 105 compares the transformed speech features to a dynamically produced speaker adapted acoustic model 108 that reflects adaptation by a speaker adaptation module 107 of one or more speaker independent acoustic models 109 stored in memory as modified by a speaker differential acoustic model 106 stored in memory. The speaker dependent differential acoustic model 106 represents differences between the speech independent acoustic model 109 and the speaker adapted acoustic model 108. As used herein, the term "speaker adaptation" refers to adaptation to a specific speaker or limited groups of speakers and/or to specifics of the speaker's audio channel, e.g., the speaker's handset and its technical characteristics. Also, in some specific embodiment it may be the case that specific single speakers cannot be fully identified and only device IDs may be available, which at times represent shared devices, e.g., in a family. Even so, speaker adaptation usually still works well, as models are adapted to the specific device and to a small number of different speaking characteristics.

Figure 2:
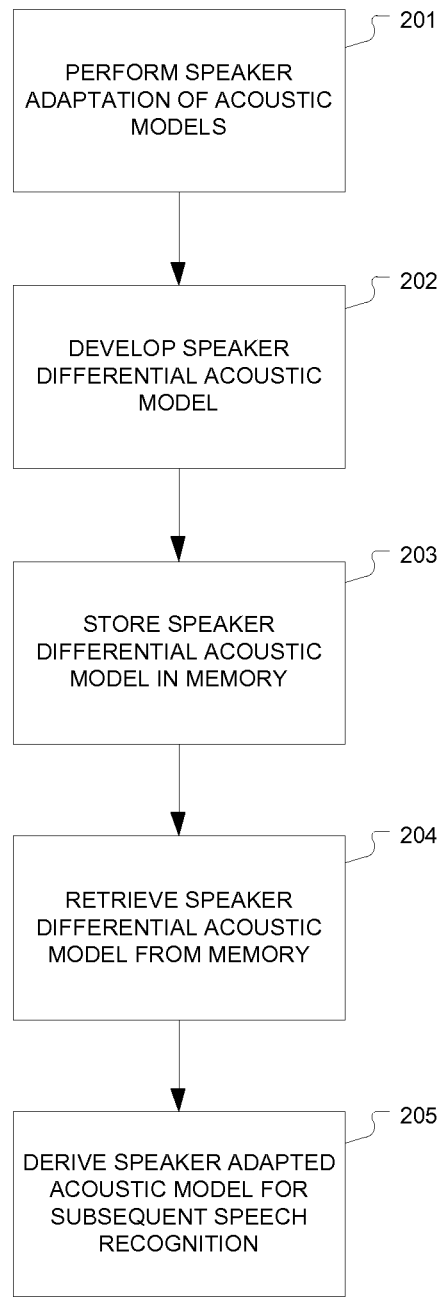
FIG. 2 shows various logical steps in a method of differential acoustic model representation according to an embodiment of the present invention.

FIG. 2 shows various logical steps in a method of speaker dependent differential acoustic model representation according to an embodiment of the present invention. During or after a recognition session with a particular user, the system performs speaker adaptation of the acoustic models, step 201. The speaker adaptation may be based on one of the typical adaptation approaches such as MLLR, MAP and/or discriminative acoustic model parameter refinement. The speaker dependent differential acoustic model is determined that represents differences between the initial speaker independent acoustic model and the speaker adapted acoustic model, step 202. The speaker dependent differential acoustic model is then stored in memory (e.g., for server-based recognition systems, this may be cloud-based memory), step 203, for later use in subsequent speech recognition sessions with that particular user. Storing the speaker dependent differential acoustic model may include selecting a limited subset of parameter differences for storage in order to control the memory size of the speaker differential acoustic model. The stored speaker differential acoustic model may then be retrieved from memory, step 204, and processed with the initial speaker independent acoustic model to derive the speaker adapted acoustic model, step 205, which may be used to perform speech recognition for the particular speaker.

Representing the speaker dependent differential acoustic model in an efficient manner may be based on adaptation of just the Gaussian mean parameters and then just the resulting mean differences can be stored for producing a useable approximation of the speaker adapted acoustic model. For example, this can involve clustering the Gaussian means and storing only mean-shifts per cluster based on multi-class mean-parameter-offsets (also known as shift-MLLR) as a differential Gaussian mean parameter representation. The approximation from Gaussian component clustering and better compression ratio of small range parameter differences results in a storage efficient representation of the speaker dependent differential acoustic model.

The estimation of the differential acoustic model representation can incorporate multiple acoustic model adaptation methods, as e.g. MLLR and MAP. The acoustic model adaptation methods are applied to compute the adapted model. The approximated differential acoustic model is estimated by minimizing the loss (according to a scoring function as the Kullback-Leibler divergence score) between the original adapted model and the approximated differential representation. The Kullback-Leibler divergence used for the acoustic model difference measure may be used to rank and keep the most important parameter differences, optimize different quantization ranges for acoustic model parameter subsets/clusters, and find storage-efficient Gaussian component clustering (acoustic model parameter subsets) to minimize the acoustic model difference measure against the size of the differential acoustic model. The estimation of the loss minimizing differential model representation can be done in a time-efficient greedy way or as a more CPU intensive search/estimation under a profile-size limiting constraint (or constraint by the maximal allowed relative score loss).

Speaker adaptation of user speech profiles may be performed online or offline. For example, online adaptation may be based on a combination of cepstral mean normalization (CMN) and single class CMLLR (of the previous user session). Offline adaptation methods beyond CMLLR that will enable more model adaptation gain with minor impact on profile sizes and switching cost (adaptation application time) can allow different choices of operating points as to profile size, switching latency and adaptation gain.

Embodiments of the present invention also include storage efficient user profile update techniques for linear transform-based acoustic model and feature adaptation. Such arrangements may be especially useful in server-based speech recognition for multiple different users across multiple remote sessions of a particular speaker. (See e.g., U.S. Pat. No. 6,766,295, which is incorporated herein by reference). Specific embodiments may realize adaptation accuracy gains similar to the gains observed when storing user dependent adaptation statistics. This is achieved by doing an update of the previously estimated linear transform using just the adaptation statistics of the current speech session, which is equivalent to storing the cumulatively adapted (session to session) acoustic model. From a feature adaptation point of view it can be regarded as estimation of feature transform(s) in the feature space(s) defined by the previous transforms(s).

Figure 3:
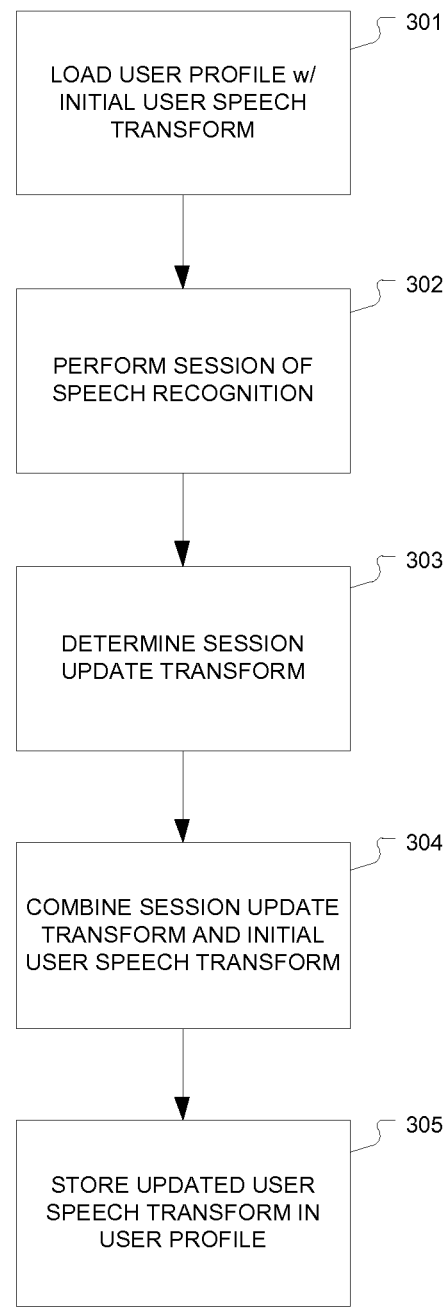
FIG. 3 shows various logical steps in a method of linear transform based adaptation according to another embodiment of the present invention.

FIG. 3 shows various logical steps in one specific embodiment. Initially, step 301, the system loads a user profile (B) for a particular speaker which includes an initial user feature transform (C) that represents speaker adapted speech recognition acoustic models (C(A)) for that speaker. When the speaker is new to the system (no prior user profile) the initial user feature transform may be an identity transform. The system then uses the initial user feature transform and speaker independent speech recognition acoustic models (A) to perform speech recognition for a session of speech utterances from the particular speaker, step 302. At some point during or after the session, step 303, the system determines a session update transform (C_delta) for a linear transform-based speaker adaptation (D, e.g. MLLR or CMLLR) of the initial user feature transform based on speech recognition data from the session such as the speech observation vectors and the recognition results.

The session update transform can be combined with the initial user feature transform to produce an updated user feature transform (C'), step 304, which can then be stored in the user profile for subsequent speech recognition with the particular speaker, step 305. That is, the updated feature transform C' is developed by combining C_delta and C such that C'(A) corresponds to C_delta(C(A)). In some specific embodiments, this can be done without a bias vector: C_delta C o=C' o where o is an acoustic observation vector for CMLLR or a component mean vector for MLLR. Other embodiments may use a bias vector (c, c_delta, c'):

$$C\_delta(Co+c)+c\_delta=(C\_deltaC)o+(C\_deltac+c\_delta)=C'o+c'$$

In the same way, this update method can be used to update a previously estimated differential acoustic model representation (e.g. expressed by multi-class shift-MLLR or shift-CMLLR offsets).

Some embodiments may store and update cumulatively (from session to session) a single feature transform per speaker/user profile. Class based relevance smoothing (statistics smoothing with artificial identity statistics as priors; e.g., U.S. Patent Publication 2009/0024390, which is incorporated herein by reference) can be used when there is not enough session data and/or as an adaptation smoothing/regularization factor—this can be considered an adaptation step size from session to session applied on the latest adapted model. On some tasks, embodiments such as those described above have performed with better accuracy results than with previous approaches based on accumulating adaptation statistics from session to session (even with the application of a "forgetting factor" for the accumulation statistics as in U.S. Patent Publication 2008/0004876, which is incorporated herein by reference). One reason for such better performance might be that each session update is based on the previous speaker adapted speech recognition acoustic model, whereas an accumulation statistics approach accumulates statistics in each session on the speaker independent model.

Speaker or domain adapted acoustic models and linear transform-based adaptation methods are widely used in many different speech recognition applications. For many applications, adaptation statistics and/or adapted acoustic models are stored within a user profile and updated over time from one user session to another. Embodiments of the present invention as described above can eliminate the need to store adaptation statistics and/or the adapted acoustic model, and instead efficiently store the latest updated linear transform(s) and/or the acoustic model parameter differences as a differential acoustic model that represent the updated acoustic model. This can be useful for all speech recognition applications and especially for those with limitations with respect to the user profile size and/or limitations with respect to the latency time for reading user profiles with demand for real-time response (command & control, dictation, telephony etc.).

Embodiments of the invention may be implemented in any conventional computer programming language. For example, preferred embodiments may be implemented in a procedural programming language (e.g., "C") or an object oriented programming language (e.g., "C++", Python). Alternative embodiments of the invention may be implemented as pre-programmed hardware elements, other related components, or as a combination of hardware and software components.

Embodiments can be implemented as a computer program product for use with a computer system, for example, as a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as local or cloud-based semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
    adapting, by a computing device, an initial speech recognition acoustic model to produce a speaker adapted acoustic model using speech recognition data from a particular speaker;
    developing, by the computing device, a speaker differential acoustic model representing one or more differences between the initial speech recognition acoustic model and the speaker adapted acoustic model;
    optimizing different quantization ranges for parameter subsets of the speaker adapted acoustic model using a scoring function;
    using the different quantization ranges to minimize an acoustic model difference measure of the speaker adapted acoustic model against the initial speech recognition acoustic model; and
    storing the speaker differential acoustic model for subsequent speech recognition with the particular speaker.

2. The method of claim 1, comprising:
    retrieving the stored speaker differential acoustic model; and
    processing the speaker differential acoustic model and the initial speech recognition acoustic model to derive the speaker adapted acoustic model.

3. The method of claim 2, comprising:
    using the derived speaker adapted acoustic model to perform speech recognition for the particular speaker.

4. The method of claim 1, comprising:
    ranking the one or more differences based on stored sizes of the one or more differences.

5. The method of claim 1, comprising:
    ranking the one or more differences based on most important differences of the one or more differences.

6. The method of claim 1, comprising:
    ranking the one or more differences using the scoring function;
    selecting a subset of the one or more differences, the subset selected based on the ranking the one or more differences;
    determining storage-efficient Gaussian component clustering of the speaker differential acoustic model using the scoring function; and
    using the subset of the one or more differences and the storage-efficient Gaussian component clustering to minimize the acoustic model difference measure of the speaker adapted acoustic model against the initial speech recognition acoustic model.

7. The method of claim 3, wherein using the derived speaker adapted acoustic model to perform the speech recognition comprises:
    producing a representative recognition output of the speech recognition data from the particular speaker, wherein the representative recognition output is constrained by a recognition language model and search algorithm; and
    comparing the representative recognition output to the derived speaker adapted acoustic model.

8. The method of claim 1, comprising:
    determining a session update transform for a linear transform-based speaker adaptation of the speaker differential acoustic model based on speech recognition data from speech utterances by the particular speaker, wherein the linear transform-based speaker adaptation uses relevance smoothing of the speech recognition data; and
    producing an updated speaker differential acoustic model by combining the speaker differential acoustic model and the session update transform.

9. A method comprising:
    loading a user profile for a particular speaker including an initial user feature transform representing speaker adapted speech recognition acoustic models;
    performing speech recognition, by a computing device, for a session of speech utterances from the particular speaker using the initial user feature transform and a plurality of speaker independent speech recognition acoustic models;
    determining a session update transform for a linear transform-based speaker adaptation of the initial user feature transform based on speech recognition data from the session;
    producing an updated user feature transform by combining the initial user feature transform and the session update transform; and
    storing in the user profile the updated user feature transform for subsequent speech recognition with the particular speaker.

10. The method of claim 9, wherein producing the updated user feature transform by combining the initial user feature transform and the session update transform is performed without a bias vector.

11. The method of claim 9, wherein producing the updated user feature transform by combining the initial user feature transform and the session update transform is performed with a bias vector.

12. The method of claim 11, wherein the bias vector is an acoustic observation vector for constrained maximum likelihood linear regression (CMLLR) adaptation.

13. The method of claim 11, wherein the bias vector is a component mean vector for maximum likelihood linear regression (MLLR) adaptation.

14. The method of claim 9, wherein the linear transform-based speaker adaptation uses relevance smoothing of the speech recognition data from the session.

15. A non-transitory computer-readable medium storing computer-readable instructions that, when executed by a processor, cause a device to:
   load a user profile for a particular speaker including an initial user feature transform representing speaker adapted speech recognition acoustic models;
   perform speech recognition for a session of speech utterances from the particular speaker using the initial user feature transform and a plurality of speaker independent speech recognition acoustic models;
   determine a session update transform for a linear transform-based speaker adaptation of the initial user feature transform based on speech recognition data from the session;
   produce an updated user feature transform by combining the initial user feature transform and the session update transform; and
   store in the user profile the updated user feature transform for subsequent speech recognition with the particular speaker.

16. The non-transitory computer-readable medium of claim 15, wherein producing the updated user feature transform by combining the initial user feature transform and the session update transform is performed without a bias vector.

17. The non-transitory computer-readable medium of claim 16, wherein producing the updated user feature transform by combining the initial user feature transform and the session update transform is performed with a bias vector.

18. The non-transitory computer-readable medium of claim 17, wherein the bias vector is an acoustic observation vector for constrained maximum likelihood linear regression (CMLLR) adaptation.

19. The non-transitory computer-readable medium of claim 17, wherein the bias vector is a component mean vector for maximum likelihood linear regression (MLLR) adaptation.

20. The non-transitory computer-readable medium of claim 15, wherein the linear transform-based speaker adaptation uses relevance smoothing of the speech recognition data from the session.

* * * * *